Jan. 13, 1931.  A. BLUHM  1,789,133

METHOD FOR SECURING FRICTION FACING MEMBERS

Filed Dec. 11, 1928

A. Bluhm
INVENTOR

By Marks & Clerk
ATTys

Patented Jan. 13, 1931

1,789,133

UNITED STATES PATENT OFFICE

ALEXANDRE BLUHM, OF PARIS, FRANCE, ASSIGNOR TO SOCIETE ANONYME FRANCAISE DU FERODO, OF PARIS, FRANCE

METHOD FOR SECURING FRICTION FACING MEMBERS

Application filed December 11, 1928, Serial No. 325,259, and in France October 18, 1928.

Friction members employed for brakes, clutches and the like are usually secured to their supports by metallic rivets or by an autogenous cementing of the friction substances.

It is found inconvenient to secure the facing by metallic rivets, since after a certain wear, the said rivets will make contact with the drum, and this will be scratched, also causing noise.

The mounting of the facing pieces by autogenous cementing is limited to the use of substances in which the agglomerating material can adhere to the metal of the support, and is further limited by the fact that the substances having this adhesion do not as a rule possess the desired friction qualities.

According to the present invention, the parts are secured in a manner which does not offer the defects inherent in the metallic riveting nor in autogenous cementing by the use of rivets or pegs consisting of substances of a different nature from the friction substance, or which will not form a unit combination therewith, and are adapted for hardening by polymerization, and will assume a sufficient mechanical strength to allow the facing to be secured to its support.

If it is desired to mount a facing on each side of a metallic support, there are used rivets consisting of two pieces with tapered heads, which make contact with the two respective facings, which pieces can be firmly secured together.

The substances used for said pegs may comprise asbestos fibres impregnated with synthetic resins or of agglomerated material of any suitable shape, in which adequate metallic members may be imbedded.

The accompanying drawing shows by way of example three forms of friction facing members according to the invention in which the first form relates to a securing method adapted for factory use, and the other two methods may be used in all cases.

The drawings also show two constructions relating to friction facing members disposed on either side of a common metallic support.

Figure 1:
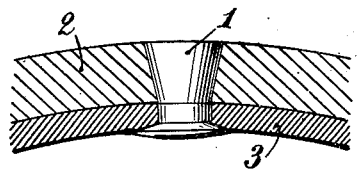
Fig. 1 is a sectional view of a facing member mounted on its support, according to the first form of construction.

Referring to Figure 1, the friction members are secured by the pins or pegs 1 which may consist of asbestos fibres which are braided and are impregnated with synthetic rosin, the whole being made sufficiently dense and rigid by cold pressing or like means. Such pins or pegs are cut to the proper length and are driven into holes formed for the purpose in the facing substance 2 and the support 3. Their length is such that during the operation of polymerizing under pressure, the pin or peg will form a head which fills up the countersunk part of the hole in the facing, and will also form a rivet head at the other end, to be placed on the opposite side of the support.

For this purpose, the whole is pressed in the hot state, and this first softens the piece and permits the formation of the heads and the said rivet ends on the various pegs, and then polymerizes these latter in order to give them the proper hardness.

It is thus feasible to mount any suitable facing members upon a removable support of sheet iron or other metal of the proper thickness, said sheet being then secured to the brake shoe by rivets or screws which can in no wise make contact with the metallic drum or other friction part.

Figure 2:
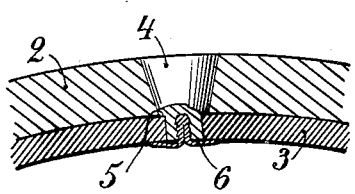
Figs. 2 and 3 are respective sections relating to two other forms of construction.
Figure 3:
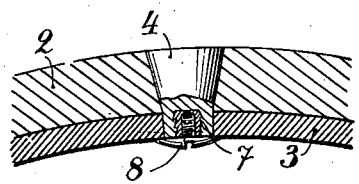

With reference to Figs. 2 and 3, the construction comprises rivets of a material analogous to the preceding, which are polymerized after a suitable member, which is adapted to be secured to the support, has been imbedded in their mass.

In the example shown in Fig. 2, the rivet 4 is given a form allowing its insertion into a corresponding hole in the facing piece. A shoulder 5 of the said rivet makes contact with the outer part of the metallic support 3, and thus prevents it from sliding under the pressure of the drum.

In the narrow part is imbedded a split rod 6 whose branches can be bent down upon the outer face of the support. The imbedded part extends no further than the shoulder, and thus even when the facing piece is completely worn down, the friction member will not be scratched.

Fig. 3 shows an analogous device. The split rod 6 is replaced by a metallic socket 7 which is imbedded in the mass, it being screw-threaded to receive a screw 8 whose flat head makes contact with the outer face of the support. Since the material in use possesses sufficient friction qualities and since the securing parts entirely fill their recess in the facing member, it is feasible to increase the number of rivets or pegs without greatly reducing the friction between the friction surfaces.

Figure 4:
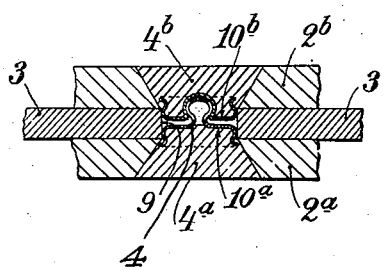
Fig. 4 is a sectional view of the first form, concerning double facings.
Figure 5:
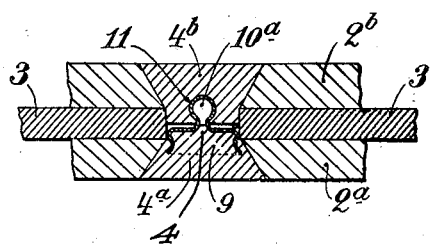
Figure 5 is a like view relating to the second form.

Referring to Figs. 4 and 5, the metallic core 3 is provided on either side with respective friction facing members 2$^a$—2$^b$. The said members are secured by the plastic rivets 4, analogous to the preceding, to the metallic core which is pierced with the hole 9. The said rivets consist of two tapered parts 4$^a$—4$^b$ which may be more or less inserted into the hole 9 and may be connected together by a device such as is used for pressure buttons.

As shown in Fig. 4, the male and female parts 10$^a$ and 10$^b$ of the said button device are secured to the corresponding parts 4$^a$—4$^b$ of the rivet when the same is manufactured, or otherwise.

In the device shown in Fig. 5, the button hole slot 10$^b$ is eliminated, and the button 10$^a$ is engaged directly in a recess 11 in the said plastic substance.

The securing device is susceptible of all desired variations without departing from the principle of the invention. For instance it is obviously feasible to modify the form, number, assembling and nature of the securing parts in use, without departing from the principle of the invention.

Claims:

1. In a friction facing, the combination of a metallic support, a friction facing member disposed thereon, and securing members traversing the said member and support, said securing members consisting of a hardened plastic substance having a high coefficient of friction, and metallic securing members which are adapted to secure said plastic members in position and do not extend outwardly of the surface of the support which is in contact with the said facing.

2. In a friction facing, the combination of a metallic support, a friction facing member disposed on the said support, securing rivets made of hardened plastic substance having a high coefficient of friction extending through the said facing member and the said support, the said rivets having a reduced part on the side of the metallic support, a slit rod imbedded in the substance of the rivets on the side of the metallic support, the two branches of the rivets being bent down upon the external face of the said metallic support and the imbedded part of the said rod not extending outwardly of the surface of the metallic support on the side of the facing member.

3. In a friction facing, the combination of a metallic support, a friction facing member disposed on the said support, securing rivets made of hardened plastic substance having a high coefficient of friction, extending through the said facing member and the said support, the said rivets having a reduced part on the side of the metallic support, a screw threaded metallic socket inserted into the substance of the rivets on the side of the metallic support, a screw with a flat head introduced in the said socket and whose flat head bears against the external face of the support, the said socket not extending outwardly of the surface of the metallic support on the side of the friction facing member.

4. In a friction facing, the combination of a metallic support, a friction facing member on both sides of the said support, securing rivets made of hardened plastic substance having a high coefficient of friction, extending through every one of the said facing members and the said support, the said rivets having a reduced part on the side of the support, male coupling members on the rivets of one of the facing members, female coupling members on the rivets of the other facing member and adapted to be fixed to the male members themselves.

In testimony whereof I have hereunto affixed my signature.

ALEXANDRE BLUHM.